UNITED STATES PATENT OFFICE.

JULIUS AUGUSTUS LIEBERT, OF NEW YORK, N. Y.

IMPROVEMENT IN MANUFACTURE OF SOLIDIFIED SAUCE.

Specification forming part of Letters Patent No. 215,944, dated May 27, 1879; application filed March 29, 1879.

*To all whom it may concern:*

Be it known that I, JULIUS AUGUSTUS LIEBERT, of the city, county, and State of New York, have invented a new and useful Improvement in the Manufacture of Solidified Sauce, which improvement is fully set forth in the following specification.

This invention consists in a process for producing solidified sauce by first mixing together raw sugar and caramel, then heating the mixture to about 300° Fahrenheit, and, after the same has cooled down to about 150°, stirring in suitable spices, so that when the mass is cooled it can be cut into blocks of convenient size for use.

In carrying out my invention, I prepare the finest spices and condiments known for the manufacture of sauces. I then mix a quantity of raw sugar together with an equal quantity of caramel and with water, and heat the mixture to a temperature of about 300° Fahrenheit, so as to hydrate and crystallize the same. When the mass has cooled down to about 150°, I intimately mix therewith the spices required, then allow it to settle, when it concentrates to a hard mass, which admits of being cut into blocks of convenient size for use.

It will be readily understood that by using different spices and condiments different sauces can be produced.

When the blocks of my solidified sauces are to be used they are dissolved in mild vinegar, to taste.

What I claim as new, and desire to secure by Letters Patent, is—

The within-described process for producing solidified sauces, by first mixing together raw sugar and caramel in about equal proportions, then heating the mixture to about 300° Fahrenheit, and, after the mass has cooled down to about 150°, stirring in suitable spices and condiments, and finally allowing the mass to cool, substantially in the manner specified.

In testimony that I claim the foregoing I hereunto set my hand and seal this 18th day of November, 1878.

J. AUGUSTUS LIEBERT. [L. S.]

Witnesses:
W. HAUFF,
E. F. KASTENHUBER.